Patented July 3, 1934

1,965,339

UNITED STATES PATENT OFFICE 1,965,339

TREATMENT OF STEAM-BOILER FEED WATER

Ralph E. Hall, Mount Lebanon, Pa., assignor to Hall Laboratories, Inc., Pittsburgh, Pa., a corporation of Pennsylvania No Drawing. Application August 18, 1933, Serial No. 685,751

4 Claims. (Cl. 210—24)

The present invention relates to the treatment of steam-boiler feed water, and more especially to the control of the alkalinity and silica content of the water in a boiler using water softened by the zeolite process.

The zeolite process is frequently used for softening water for steam-boiler purposes. In the zeolite process the calcium and magnesium of the soluble calcium and magnesium compounds in the water are replaced by sodium, due to the base-exchange properties of the zeolite. The removal of the calcium and magnesium softens the water. Wherever the zeolite type of softening is used on a water containing temporary hardness, the substitution of sodium for the calcium and magnesium in the water results in a potential alkalinity in the feed water which is converted into high alkalinity in the boiler water, because the sodium bicarbonate of the feed water decomposes to form caustic soda in the boiler water. As a rule the natural waters containing bicarbonate also contain a relatively high quantity of silica. The zeolite softener does not remove silica, which therefore remains unchanged from that in the raw water. Thus, there may result from the zeolite treatments boiler waters with high alkalinity and high silica.

The high alkalinity is objectionable since it is likely to cause caustic embrittlement of the boiler metal, and also foaming and carry-over of boiler water in the steam. Under the conditions of high alkalinity in the boiler water, the silica tends to combine with the calcium to form a hard adherent calcium-silicate scale.

I have found that this defect in the zeolite treatment for boiler water may be remedied in part or wholly, depending upon conditions, by adding to the water prior to the zeolite treatment, an alkali-metal pyrophosphate which will act selectively on the magnesium to sequester the magnesium in an extremely slightly ionizable condition. Thus, while the zeolite removes the calcium from the water, the greater part of the magnesium can be passed through the zeolite to the boiler, where it has a useful function in preventing excessive alkalinity and in combining with the silica to produce a non-adherent sludge. Under the conditions of relatively low controlled alkalinity essential in the water in the boiler, the magnesium coming to the boiler does not, in general, combine with the orthophosphate radical when it is maintained in the boiler water for the prevention of adherent calcium-sulphate scale, but combines with either the hydroxide and is precipitated as non-adherent magnesium-hydroxide sludge, or combines with silica to form non-adherent magnesium-silicate sludge. Thus, at times magnesium compounds have been used for treating the boiler water in order to control the concentrations of alkalinity and silica therein within satisfactory limits, and, where the sludge in the boiler is of small amount, to provide sludge which will absorb on its surfaces undesirable quantities of oil coming to the boiler water.

At the temperature of the boiler water, the pyrophosphate treating chemical is transformed into orthophosphate, and thus of itself effects reduction of alkalinity in the boiler water, as described in United States Patent No. 1,903,041, issued to Ralph E. Hall and Henry A. Jackson, March 28, 1933. By this transformation, the magnesium is freed from its sequestration in the pyrophosphate complex radical and is therefore in condition to combine with hydroxide or silicate radical as above set forth.

As ordinarily operated, a zeolite softener removes the calcium to a residual of about 2 or 3 parts per million, and the magnesium to a residual of about 0.5 to 1 part per million of water. Because of the function magnesium performs in the boiler water, it is of advantage to remove the calcium but to allow the magnesium or a part of it to pass through the zeolite softener and go to the boiler. This is effected in my process by adding to the water prior to passing it through the zeolite, the proper amount of an alkali-metal pyrophosphate, preferably tetrasodium pyrophosphate or a mixture thereof with sodium acid pyrophosphate. The action of the sodium pyrophosphate is to sequester the magnesium ion in a complex molecule which gives an extremely low magnesium-ion concentration. Theoretical considerations indicate that sodium pyrophosphate of the simplest formula $Na_4P_2O_7$ probably has the molecular constitutional formula $Na_2(Na_2P_2O_7)$ in many of its reactions. The sodium pyrophosphate is believed to combine with magnesium to form a complex molecule having the molecular formula $Na_2(MgP_2O_7)$ in which the magnesium is held in a very slightly ionizable condition. This complex is also readily soluble. The ion concentration of magnesium in equilibrium with the complex sodium-magnesium-pyrophosphate radical is less than that which represents equilibrium with the base-exchange zeolite mineral during the passage of the water through the mineral at the rates of flow characteristic of zeolite-softener operation. Therefore, the magnesium is held against the action of the zeolite and is carried through the zeolite softener. To convert the magnesium into such slightly ionized complex-radical form requires about 2 formula weights of sodium pyrophosphate to 1 formula weight of magnesium, as indicated by the molecular formula set forth above, and I therefore prefer to add the sodium pyrophosphate to the water in such proportions. If less than this proportionality of the pyrophosphate to the magnesium is established in the water, then a part only of the magnesium will be carried through the zeolite softener. Thus, if it is desired to have the zeolite softener remove a part only of the magnesium from the water, then the amount of pyrophosphate used may be correspondingly decreased.

As contrasted with its action on calcium, the pyrophosphate has a markedly selective action in sequestering the magnesium in soluble very slightly ionized form. If an amount of pyrophosphate is added to the water, about sufficient to combine with all of the magnesium and sequester it in slightly ionized form, similar sequestration of the calcium will not take place, and the zeolite softener will exercise its usual function in exchanging sodium for calcium and thereby removing calcium from the water. However, if a large excess of the pyrophosphate is added to the water, it has a tendency to similarly sequester the calcium. Therefore, any large excess of the pyrophosphate above that required to sequester the magnesium ions should be avoided for this reason, as well as for reasons of economy.

The form in which the pyrophosphate is used will be determined primarily by the condition of the water to which it is added. If it is desired to decrease the acidity of the water, a normal alkali-metal pyrophosphate salt may be used, since the normal pyrophosphate is slightly alkaline. On the other hand, a mixture of normal pyrophosphate with an acid pyrophosphate salt may be used, the proportions being adjusted to suit the water conditions. Where a large excess of sodium bicarbonate or bicarbonate hardness is present in the raw water, it may be advantageous to use pyrophosphoric acid alone or mixed with a pyrophosphate salt. The pH value of the water should be adjusted for the proper operation of the zeolite, and the choice of the particular form of pyrophosphate gives an opportunity to make such adjustment. Therefore, when I speak of an alkali-metal pyrophosphate, I intend to include the acid salts as well as the normal salts. When I speak of a pyrophosphate without other qualification, I intend to include pyrophosphoric acid as well as the salts, since the pyrophosphoric acid may be considered to be hydrogen pyrophosphate.

As a typical example, a water containing 22 parts per million of calcium and 14 parts per million of magnesium was treated with 266 parts per million of sodium pyrophosphate ($Na_4P_2O_7$). The effluent water from the zeolite softener gave, upon analysis, 14 parts per million of magnesium and 2 parts per million of calcium, showing that the action of the zeolite on the calcium had been impeded scarcely at all, while at the same time there had been no action of the zeolite on the magnesium. If all of the magnesium is to be carried through the zeolite softener, I prefer to use the sodium pyrophosphate in a slight excess of 2 formula weights of sodium pyrophosphate to 1 formula weight of magnesium, as a slight excess of the sodium pyrophosphate has substantially no effect in carrying calcium through the zeolite softener.

The magnesium as thus carried through the zeolite softener passes to the boiler where it can combine with excess hydroxide to form non-adherent magnesium-hydroxide sludge, thus removing both excess hydroxide and magnesium from the water. It also combines with silica to form non-adherent magnesium-silicate sludge which can be readily removed by blow-down.

The pyrophosphate, which has a useful function in carrying the magnesium through the zeolite softener, has an additional useful function in the water in the boiler. As described in the Hall and Jackson Patent No. 1,903,041, of March 28, 1933, the pyrophosphate at the temperature of the boiler water and in the presence of the small amount of calcium which comes through the zeolite softener, is changed to orthophosphate and combines with the calcium to form a calcium-orthophosphate sludge and prevent the calcium from forming adherent calcium-sulphate or calcium-silicate scale.

While I prefer to employ sodium pyrophosphate, the pyrophosphates of the other alkali-metals may be used, such, for example, as potassium pyrophosphate, lithium pyrophosphate, etc.

While I have specifically described the preferred procedure of carrying out my process, it is to be understod that the invention is not so limited but may be otherwise embodied and practiced within the scope of the following claims.

I claim:

1. The process of treating steam-boiler feed water containing calcium and magnesium compounds, which comprises adding to the water an alkali-metal pyrophosphate and then passing the water through a zeolite softener.

2. The process of treating steam-boiler feed water containing calcium and magnesium compounds, which comprises adding to the water a sufficient amount of an alkali-metal pyrophosphate to hold the greater part of the magnesium against removal by zeolite, and then passing the water through a zeolite softener.

3. The process of treating steam-boiler feed water containing calcium and magnesium compounds, which comprises adding to the water an alkali-metal pyrophosphate in an amount sufficient to hold a substantial part of the magnesium against removal by zeolite, but insufficient to hold a substantial part of the calcium against removal by zeolite, and then passing the water so treated through a zeolite softener.

4. The process of treating steam-boiler feed water containing calcium and magnesium compounds, which comprises adding to the water a pyrophosphate and then passing the water through a zeolite softener.

RALPH E. HALL.